Dec. 15, 1942.                A. L. LANGEL                2,305,014
                               BAKING PAN
                          Filed July 5, 1941          2 Sheets-Sheet 1
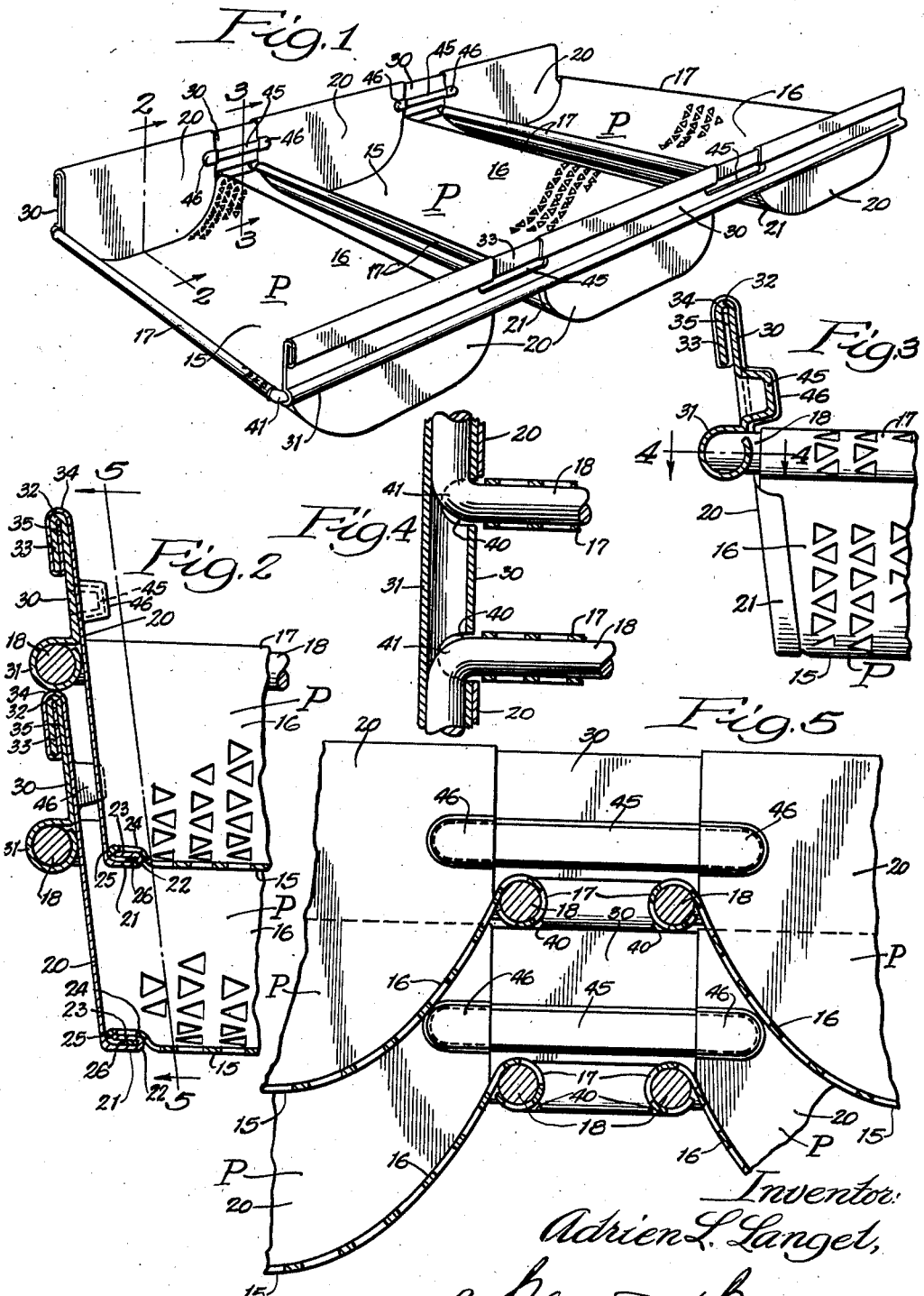

Dec. 15, 1942.   A. L. LANGEL   2,305,014
BAKING PAN
Filed July 5, 1941   2 Sheets-Sheet 2
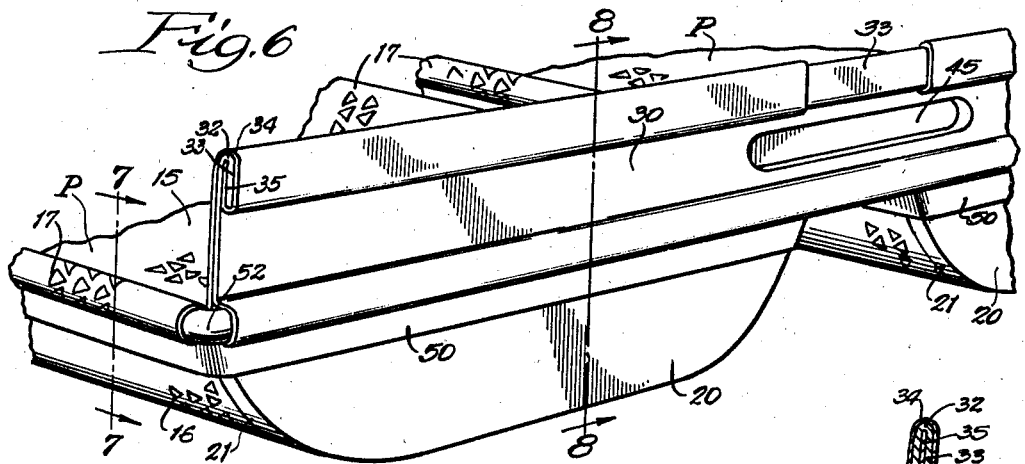
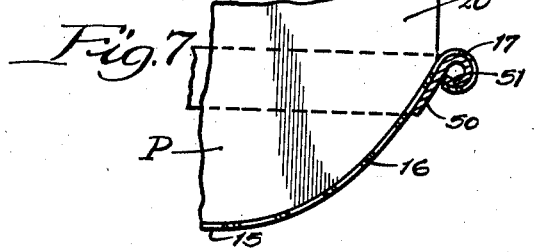
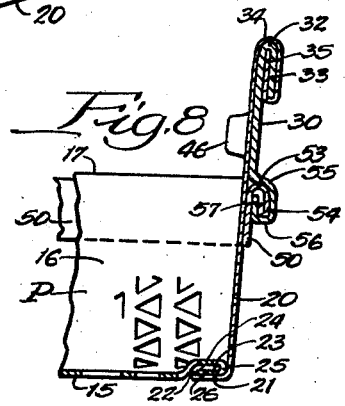
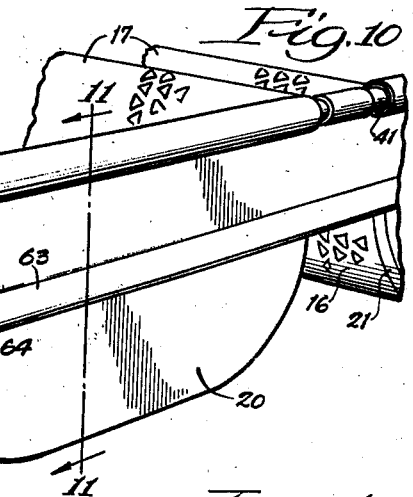
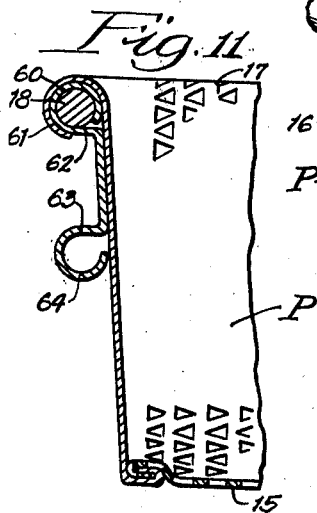
Inventor:
Adrien L. Langel,
By Flemming & Flemming
Attorneys.

Patented Dec. 15, 1942

2,305,014

UNITED STATES PATENT OFFICE 2,305,014

BAKING PAN

Adrien L. Langel, Chicago, Ill., assignor to Chicago Metallic Manufacturing Company, Chicago, Ill., a corporation of Illinois Application July 5, 1941, Serial No. 401,114

10 Claims. (Cl. 53—6)

This invention relates to baking pans, particularly such as are used in the baking of bread on a commercial scale.

The improvements which characterize my present invention are directed in large part to the means by which individual pans may be assembled with other like pans into a set, and connected together in unitary relation with the aid of straps which are extended along the ends of the several pans in the set. More particularly these straps are joined to the several pans in a manner which definitely fixes the position of each pan in the unit, and which secures the several pans against release from the pan set. The straps are furthermore provided with means by which the pans are evenly spaced from each other and maintained apart in such relation. The straps are also so formed as to be usable with pans having either low or high side walls, the position of the straps being desirably reversed in such cases. I further provide in connection with the straps of each pan set a continuous ledge, free of projections and exposed edges, and of substantial area, whereon a superposed pan set may be rested when two or more of the pan sets are to be stacked in nesting relation; also as part of each strap a pair of reinforcing beads which are continuous from end to end of the pan set so as to assure maintenance of alignment with a consequent even resting of the bottoms thereof upon an oven hearth when baking is to be performed; and also centering means by which one pan set is required to occupy a predetermined endwise position with respect to the pan sets above and below, the pans themselves being thereby protected against contact with each other when so nested. All such objectives may be gained with a construction that need involve no rivet or weld connections, but only an interlocking of the structural parts as hereinafter noted.

These and various other objects of my invention, as will hereinafter appear, may be realized from the constructions which are illustrated in the accompanying drawings in the manner following:

Figure 1 is a perspective view of a unitary set of pans having relatively low side walls;

Fig. 2 is an enlarged detail in section, taken on line 2—2 of Fig. 1, showing two pans in superposed relation with one nested within the other;

Fig. 3 is a detail in section, taken on line 3—3 of Fig. 1;

Fig. 4 is a detail in section taken on line 4—4 of Fig. 3;

Fig. 5 is a detail in section, taken on line 5—5 of Fig. 2;

Fig. 6 is a fragmentary detail in perspective on an enlarged scale, showing the near corner of a pan set in which the edge reinforcements for the individual pans are of sheet metal;

Figs. 7 and 8 are sectional details taken, respectively, on lines 7—7 and 8—8 of Fig. 6;

Fig. 9 is a fragmentary perspective view of the sheet metal edge reinforcement shown in Figs. 6-8;

Fig. 10, which is a view similar to Fig. 8, shows the strap connection between two pans having relatively high side walls when combined into a set; and Fig. 11 is a detail in section, taken on line 11—11 of Fig. 10.

In the showing of Fig. 1 three pans P are combined into a set to be handled as a unit. These pans which are alike comprise in each instance a sheet metal bottom 15 having opposite portions thereof upwardly sloped to provide relatively low sides 16. The pan sides along their edges 17 are curled outwardly and around a reinforcing frame 18 of wire or the like. This frame which is desirably in the form of a rectangle is extended along and around the sides and ends of the pan in a way which will be presently described. The sheet metal of which the bottom and sides of the pan are formed is preferably perforated in any desired way so as to promote the passage therethrough of heated gases when placed in an oven, thereby adapting the pan set for open hearth use.

The two ends of each pan may be alike, and each consists of a plate 20 which in the form shown in Figs. 1-6 is extended upwardly beyond the plane of the reinforcing frame to which the pan sides are joined. Along its bottom and lower side edges each end wall is inturned at 21 and then reversely bent at 22 to provide a tongue 23, and the pan bottom adjacent the end wall is likewise offset upwardly as at 24, and then reversely bent at 25 to provide a complementary tongue 26. The two tongues 23 and 26 are interfitted in interlocking relation to form a seam as best shown in Fig. 2. In this way the pan ends may conveniently be securely joined to the bottom.

When several pans are united into a set, as herein illustrated, they may be interconnected with the aid of a strap 30 which is extended along the outer face of the several end walls of the pans, the strap along its lower edge being outwardly extended for curling in the form of a bead 31 around the frame 18 as best shown in Fig. 2. Near its upper edge the strap is reversely bent at 32 to provide a tongue 33, and the pan end 20 which along its upper edge may be similarly bent at 34 laps over the strap tongue 33 and therearound to terminate in a tongue 35 which is interlocked therewith. By a pinching operation, a tight seam may be provided along the top edge of each pan end. Owing to the multi-ply thickness of the pan end and strap at this point, a strong and adequate edge reinforcement is here provided.

As shown, the pan sides 16 are disposed in an easy slope which terminate at the frame around which the side edges 17 are curled. This is some distance below the upper edge of the pan ends which are desirably slanted outwardly at a slight angle (see Fig. 2) to facilitate nesting. The outwardly extending bead 31 at the lower edge of the strap which surrounds the frame is itself internally reinforced thereby so that when nesting takes place, the bead of one pan set may rest squarely upon the upper reinforced edge of the pan ends of the set therebelow. In this way the load is sustained over an extended area of surfaces which are adequate for the purpose.

The bead 31 along the lower edge of the strap is interrupted by certain openings 40 which occur at points opposite the curled side edges 17 of the pans through which two of the frame sides are received. In its rectangular form, as herein suggested, the frame is required to execute bends 41 at the four corners, and at such points the frame passes through the openings 40 in the bead of the strap. By forming the strap initially with incisions, which define these openings when the bead is formed, definite places are provided for receiving the pan frames so that the positions of the several pans in the set will be accurately predetermined and fixed.

Above each adjacent pair of bead openings 40 the strap is formed with an inwardly extending boss 45 that is elongated horizontally through a distance slightly greater than the space between the end walls of two adjacent pans. The end walls of adjacent pans are also inwardly bossed at 46 to provide in effect hoods within which may be received the end portions of the elongated boss in the strap. The length of these three interfitting bosses, also their vertical position, is such that each set of bosses will occupy a position above the reinforced side edges of the pans but below the sloping sides of a superposed pan set which is in nesting relation therewith, all as best indicated in Fig. 5. When in stacked relation, with the bead of one strap rested upon the reinforced upper edge of the end walls of a lower pan set, the set of three bosses on a lower pan set will just fit in between the sloping sides of two pans in the set thereabove, provided that the endwise positions of the two pans be in register as shown in Fig. 5. By this expedient of the bosses inwardly extending at points between adjacent pans in each set, I provide an accurate means for centering one pan set with respect to another which is thereabove in nesting relation, so that support of the load is confined to the beads and reinforced edges of the connecting straps. The bosses in each set, while unconnected, act nevertheless to positively lock the pans against endwise shifting, inasmuch as the center boss inset from the strap engages at its ends with the hooded bosses which extend inwardly from the pan end walls.

Coming now to Figs. 6–9, I have here shown a construction which differs from the one already described mainly in the construction of the reinforcing frames for the several pans. As here shown, each frame is of sheet metal in the form of a strap 50 which may be bent into the form of a rectangle for surrounding the two ends and sides of the pan. The upper edge of this strap, along the curled side edges 17 of each pan, is itself curled outwardly and downwardly, as at 51. The pan edges along the sides are curled around the inner curl 51 of the strap as best shown in Fig. 7, so as to be interlocked therewith in much the same manner as in the case of the wire reinforcing frame (see Fig. 5). It may be desirable, however, to vary the cross-sectional form of the reinforcing strap, particularly where it is extended along the end walls of each pan, and for this purpose the curl 51 undergoes a change in shape at the frame corners 52 to gradually assume a flattened form (see Fig. 8) having a reverse bend 53 from which depends a tongue 54. With such a form of reinforcing edge, the connecting strap 30 is adapted to interlock through an outset 55, a reverse bend 56 and an upwardly extending, complementary tongue 57. With the parts interfitted as best shown in Fig. 8, a squeezing pressure may be applied to produce in effect a seam which interlocks this strap fixedly to the reinforcing frame through the portions thereof which are extended along the end walls of each pan. The remaining features of construction of the pan shown in Figs. 6–9 may be the same as previously described, similar parts being designated by like reference characters wherever feasible.

Referring now to Figs. 10 and 11, the pan here shown may be the same as already described except for the greater height of its sides 16 which proceed on upwardly to terminate in substantially the same plane as the upper edge of the end walls 20 of the pan. The reinforcing frame of wire 18 (or sheet metal) is fitted within the curled upper edge 17 extending along the pan sides, and along the pan ends this frame is enclosed first within a curled bead 60 formed along the upper edge of the connecting strap and then within the curled upper edge 61 of the end walls of the pan. The bead 60 formed along the connecting strap upper edge is desirably formed as part of an outset 62 on the strap with the curl proceeding upwardly and inwardly therefrom in opposition to the direction of the curl 61 which is formed thereover proceeding outwardly and downwardly from the upper edge of the pan ends. In this construction the lower edge of the connecting strap may also be outset at 63 and then downwardly and inwardly curled as at 64 to provide a bead which may or may not be reinforced, as desired. The upper edge of the pan walls, both sides and ends, are thus observed to be reinforced and to lie in substantially the same plane and, when nesting takes place, the bead along the lower edge of the connecting straps of one pan set are adapted to be rested upon the reinforced upper edges of the end walls of the pans in a lower set, all as hereinbefore described. This construction differs principally in that the higher side walls permit the use of a common reinforcement for the upper edges of the side and end walls of each pan, and the association therewith of a connecting strap whose opposite longitudinal edges are desirably formed alike, i. e., with an outset bead which will furnish adequate area for engagement of superposed pan sets which are to be stacked in nesting relation.

According to the present construction, each individual pan is reinforced by a frame which is interlocked with the upper edge portion of two of the opposite walls—the side walls as herein illustrated. The remaining two walls, viz., the ends, are interlocked in their upper edge portions with the straps which constitute the means by which the several pans are connected together in unitary relation. While spot welding, riveting, or other expedients may be resorted to to enhance the connections between each pan and the straps, this is not necessary, although perhaps desirable. The positions of the several pans relative to the straps are fixed by the openings in the turned edges of the latter, the reinforcing frames being extended through such openings and receiving engagement from the adjacent edges of the connecting straps. To further assure that this relationship will be fixed, the straps are provided with inwardly extending bosses, opposite ends of which abut the ends of hoods formed on end walls of adjacent pans. By these several expedients the positions of the pans are amply secured, and in use they may be depended upon to remain in their original condition for a long period of service.

The connecting straps whose edges are outturned to provide widened ledges both above and below are thereby reinforced to adequately sustain the load which is imposed upon them, to the exclusion of the pans, when a number of duplicate pan sets are nested together in superposed relation. To assist in a correct placing of these pan sets, one directly above the other, the bosses which are inset from the pan ends will assist in guiding each succeeding pan set into proper position for nesting without imposing any load or strain upon the relatively light sheet metal which forms the walls and bottom of the several pans themselves. The advantage of such a device should be obvious.

I claim:

1. A baking pan set comprising a plurality of pans each having relatively high opposite end walls aligned in two planes, a frame for each pan in connection with the relatively low side walls thereof, a pair of straps one extended along the end walls at one end of each pan, means interconnecting the upper edge of the end walls of each pan with the proximate strap, the lower edge of each strap being inturned for interlocking with opposite ends of each frame and being formed with openings through which the frame corners may pass with portions of the strap lower edges between the openings occupying positions between adjacent pans whereby to assure a fixed spacing therebetween.

2. A baking pan set in which is comprised a plurality of aligned pans each having relatively high and low end and side walls, respectively, a pair of straps one extended along each end wall at one end of each pan and interconnected therewith, and means extended inwardly from each strap, and adjacent thereto and in coaction therewith other means from each pan end, positioned to lie between the side walls of the pans in a superposed duplicate pan set whereby to arrest shifting movement of one pan set endwise of the other.

3. A baking pan set in which is comprised a plurality of aligned pans each having relatively high and low end and side walls, respectively, a pair of straps extended along the walls at opposite ends of the pans and interconnecting therewith, means extending inwardly from the straps at points between adjacent pans and above the side walls thereof and coacting with the ends of adjacent pans to serve as spacers therefor, and centering means extending inwardly from the end walls in interlocking relation to the spacer means adapted to cooperate with the adjacent side walls of a superposed duplicate pan set to arrest shifting movement of one pan set endwise of the other.

4. A baking pan set comprising a plurality of pans each having side and end walls relatively low and high, respectively, the end walls of the several pans being aligned in parallel planes, a pair of connecting straps extended along the walls at opposite ends of the pans for connection therewith, the lower edges of each strap being bent to provide a hollow bead with openings therein at points opposite the sides of each pan, and a frame associated with each pan in connection with the side walls thereof and extended through the bead openings for accommodation within the bead to the outside of the pan ends.

5. A baking pan set in which is comprised a plurality of aligned pans, a reinforcing frame extending around each pan and in connection with two of its opposite walls, a pair of straps connected with the remaining walls of each pan, each strap being formed with outset upper and lower edges within one of which is accommodated one of the sides of each reinforcing frame, the side and end walls of each pan being outwardly slanted sufficiently to receive therein the pans of a superposed duplicate pan set with the lower edge of one strap receiving engagement from and support by the upper edge of the strap therebelow.

6. A baking pan comprising a plurality of aligned pans each having a reinforcing frame extended around the sides and to the outside of the ends thereof with means for securing two opposite pan sides to the frame, a pair of straps extended along opposite ends of the aligned pans, each strap along its upper edge being interlocked with the proximate end wall and providing therewith a reinforced upper edge which is outset with respect to the pans, the lower strap edge being also outset and inwardly bent and in engagement with each frame to provide a lower reinforced edge, the several pans so interconnected constituting a set adapted to be received within a second duplicate set in nesting relation therewith with the lower edges of the connecting straps in the upper set rested upon and receiving support from the upper edges of the straps interconnecting the pans in the lower set.

7. A baking pan set comprising a plurality of aligned pans each having a closed reinforcing frame with which two only of the pan walls are connected along their edges, a pair of straps extended along two remaining walls of each pan and connected therewith and also with the reinforcing frame, interengaging means on each strap and frame for fixedly positioning the several pans in the set, and means extending inwardly from each pan end at points adjacent an edge thereof adapted to underlie the side walls of pans in a superposed duplicate pan set whereby to cooperate therewith in arresting shifting movement of one pan set endwise relative to the other.

8. A baking pan set comprising a plurality of aligned pans each having high and low end and side walls, respectively, means extended lengthwise of the pan set in connection with the upper edge portions of the end walls of the several pans for securing them together in unitary relation, spacer means inwardly extended from the securing means at points between the pans within the set above the side walls thereof adapted to engage opposed portions of adjacent end walls of the pans to maintain the pans apart a minimum fixed distance, and centering means inwardly extended from the end walls of the pans at points above the side walls thereof and interlocked with the ends of the spacer means adapted to engage the outer sides of adjacent side walls of the pans comprised in a superposed duplicate pan set when in nested relation therewith.

9. A baking pan set comprising a plurality of aligned pans having side and end walls, means extended lengthwise of the pan set interlocked with the upper edge portions of the end walls of the several pans providing a connection therebetween such that they are maintained in unitary relation, a reinforcing frame extended around each pan and interlocked with the upper edge portions of the side walls thereof, and plural means extended from the interlocking connection between the pans engageable with the reinforcing frames for locking the pans in fixed positions relative to each other.

10. A baking pan set comprising a plurality of aligned pans having inclined side and end walls, means extended lengthwise of the pan set interlocked with the upper edge portions of the end walls of the several pans providing a connection therebetween such that they are maintained in unitary relation, upper and lower ledges formed on the interlocking connecting means, a reinforcing frame extended around each pan and interlocked with the upper edge portions of the side walls thereof, and plural means extended from the interlocking connection between the pans engageable with the reinforcing frames for locking the pans in fixed positions relative to each other, the pan sets so formed being adapted for nesting in superposed relation with a duplicate pan set with the lower ledge of the one rested upon and receiving support from the upper ledge of the other and without imposing any of the load upon the pan walls themselves.

ADRIEN L. LANGEL.